8472X
3 Sheets. Sheet 1.
J. Goulding,
Steam-Boiler Fire-Tube.
Patented Oct. 25, 1834.
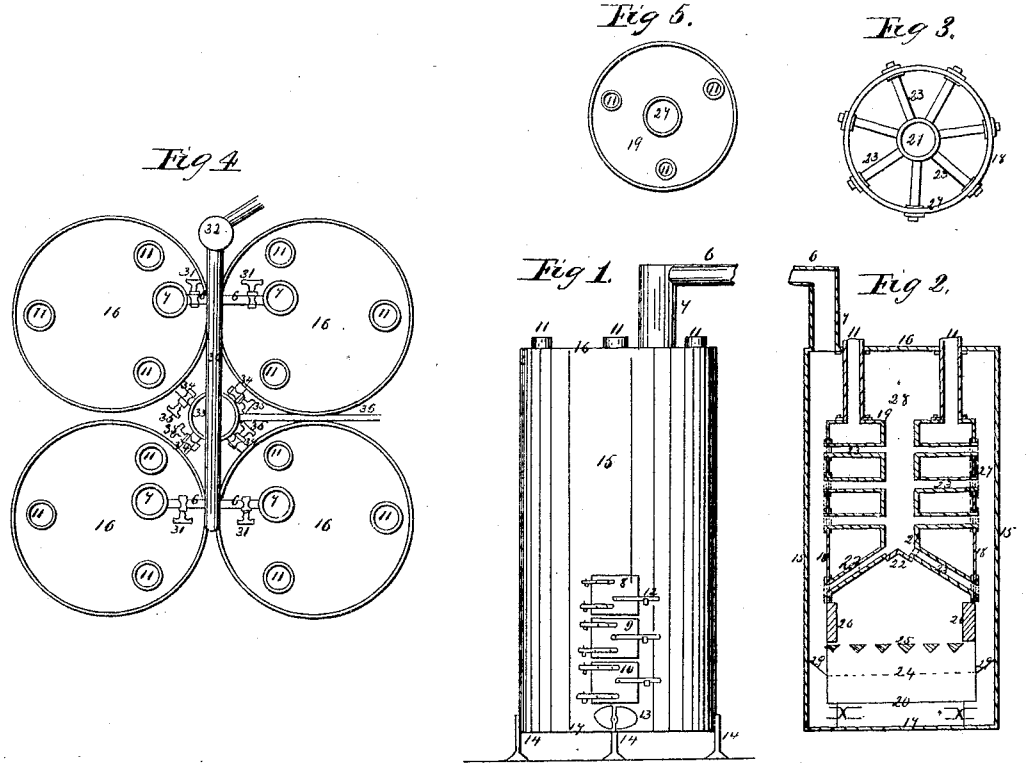
Plate 1.
AM. PHOTO-LITHO. CO. N.Y. (OSBORNE'S PROCESS.)

8472X
J. Goulding, 3 Sheets. Sheet 2.
Steam-Boiler Fire-Tube.
Patented Oct. 25, 1834.
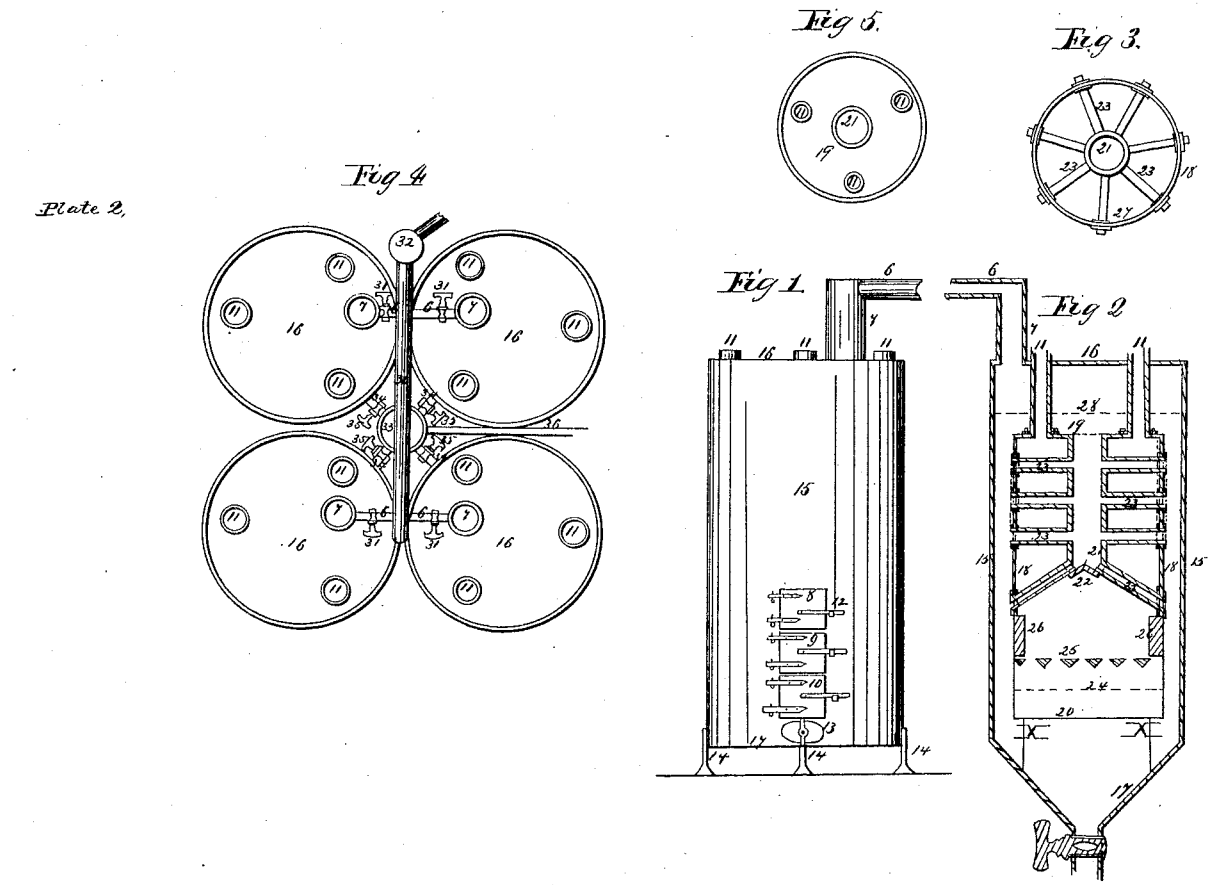
Plate 2.
AM. PHOTO-LITHO. CO. N.Y. (OSBORNE'S PROCESS.)

8472X
3 Sheets. Sheet 3.
J. Goulding,
Steam-Boiler Fire-Tube.
Patented Oct. 25, 1834.
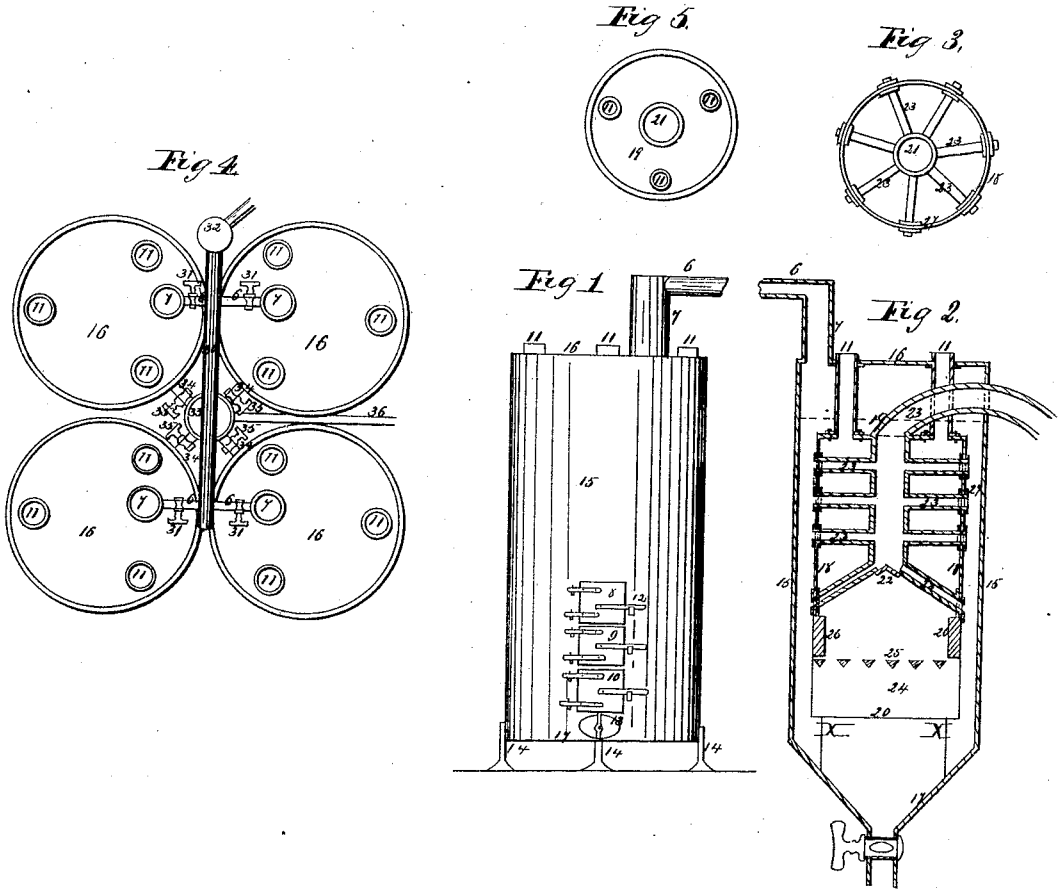
Plate 3.
AM. PHOTO-LITHO. CO. N.Y. (OSBORNE'S PROCESS.)

8472X

UNITED STATES PATENT OFFICE.

JOHN GOULDING, OF DEDHAM, MASSACHUSETTS.

IMPROVEMENT IN MAKING DRY STEAM OR PREVENTING WATER FROM PASSING OUT OF A BOILER INTO A STEAM-PIPE.

Specification forming part of Letters Patent dated October 25, 1834.

*To all whom it may concern:*

Be it known that I, JOHN GOULDING, machinist, of Dedham, in the county of Norfolk and Commonwealth of Massachusetts, have invented or discovered a new and useful Mode of Making Dry Steam or Preventing Water from Passing or Going Over out of a Boiler into a Steam-Pipe; and I do declare that the following is a full and exact description of said mode as invented or discoverd by me.

To prevent particles of water or spray from the water from passing through the steam-chamber and into the steam-pipe, let a wisp, tangle, or irregular coil of small wire be placed in the steam-chamber, occupying six or eight inches of the lower part thereof.

Horizontal layers of fine woven wire placed one above another at small intervals will answer the same purpose, or very fine bars may be placed in the funnel crosswise, and one set transversely to another; but the wisp, tangle, or irregular coil of fine wire appears to me cheapest and best.

I claim as my invention or discovery—

The modes above mentioned of making dry steam or preventing water from passing or going over out of a boiler into a steam-pipe.

JOHN GOULDING.

Witnesses:
HORACE MANN,
CHARLES EDWARD RAHN.